(12) United States Patent
Eliav et al.

(10) Patent No.: US 11,256,776 B2
(45) Date of Patent: Feb. 22, 2022

(54) SYSTEM AND METHOD FOR ON-THE-FLY CONVERSION OF NON-ACCESSIBLE ONLINE DOCUMENTS TO ACCESSIBLE DOCUMENTS

(71) Applicant: DOUBLEDU LTD, Petach Tiqwa (IL)

(72) Inventors: David Eliav, Petach Tiqwa (IL); David Adi, Petach Tiqwa (IL)

(73) Assignee: DOUBLEDU LTD

( * ) Notice: Subject to any disclaimer, the term of this patent is extended or adjusted under 35 U.S.C. 154(b) by 44 days.

(21) Appl. No.: 16/345,656

(22) PCT Filed: Oct. 18, 2017

(86) PCT No.: PCT/IL2017/051147
§ 371 (c)(1),
(2) Date: Apr. 26, 2019

(87) PCT Pub. No.: WO2018/078614
PCT Pub. Date: May 3, 2018

(65) Prior Publication Data
US 2019/0278825 A1    Sep. 12, 2019

(30) Foreign Application Priority Data
Oct. 31, 2016    (IL) .......................................... 248651

(51) Int. Cl.
*G06F 16/958*    (2019.01)
*G06F 16/955*    (2019.01)
(Continued)

(52) U.S. Cl.
CPC ........ *G06F 16/972* (2019.01); *G06F 16/9558* (2019.01); *G06F 40/106* (2020.01); *G06F 40/143* (2020.01); *G06F 40/151* (2020.01)

(58) Field of Classification Search
CPC ...... G06F 16/972; G06F 40/14; G06F 40/106; G06F 40/151; G06F 16/9558; G06F 16/957
See application file for complete search history.

(56) References Cited

U.S. PATENT DOCUMENTS 7,010,581 B2    3/2006  Brown et al.
7,370,269 B1 *  5/2008  Prabhu .................. G06F 16/954
                                                    715/230
(Continued)

FOREIGN PATENT DOCUMENTS

WO         2009073682 A1     6/2009

OTHER PUBLICATIONS

International Search Report and Written Opinion dated Jan. 23, 2018 for Application No. PCT/IL2017/051147.
(Continued)

*Primary Examiner* — Stephen S Hong
*Assistant Examiner* — Ahamed I Nazar
(74) *Attorney, Agent, or Firm* — Mendelsohn Dunleavy, P.C.

(57) ABSTRACT

The invention relates to a method for an automatic and on-the-fly conversion of website's non-accessible documents to respective documents in an accessible format, comprising: (a) inserting a first script within each web page of said website that contains one or more non accessible documents; (b) upon loading of a web page from said website to a user's browser, executing said first script, which in turn identifies all original links within said web page to non-accessible documents, said script also substitutes a respective alternative link for each of said original links respectively, each of said alternative links leads to an alternative address, respectively, within a conversion server; (c) upon clicking by a user of one of said alternative links,
(Continued)

extracting by said conversion server the respective non-accessible document, and transferring the respective non accessible document to said conversion server; (d) converting said non-accessible document to a respective document in an HTML format; (e) adding to said HTML format document at least an accessibility ruler script, thereby creating an accessible document; (f) optionally adding one or more additional scripts to said accessible document; and (g) displaying said accessible document at the user's browser, while simultaneously executing said accessibility ruler script and said additional scripts, if exist.

9 Claims, 5 Drawing Sheets

(51) Int. Cl.
    *G06F 40/106*     (2020.01)
    *G06F 40/151*     (2020.01)
    *G06F 40/143*     (2020.01)

(56) References Cited

U.S. PATENT DOCUMENTS

| | | | | |
|---|---|---|---|---|
| 7,398,464 | B1* | 7/2008 | Wei | G06F 40/103 715/239 |
| 2002/0178007 | A1* | 11/2002 | Slotznick | G09B 5/06 704/270.1 |
| 2003/0093565 | A1* | 5/2003 | Berger | H04L 51/066 709/246 |
| 2004/0049579 | A1* | 3/2004 | Ims | H04L 67/2823 709/225 |
| 2007/0211071 | A1 | 9/2007 | Slotznick et al. | |
| 2007/0255792 | A1* | 11/2007 | Granberg | H04L 51/066 709/206 |
| 2008/0065649 | A1 | 3/2008 | Smiler | |
| 2008/0189648 | A1* | 8/2008 | Anglin | G06F 16/957 715/781 |
| 2009/0144158 | A1* | 6/2009 | Matzelle | G06F 16/957 705/14.56 |
| 2011/0249284 | A1 | 10/2011 | Seabright et al. | |
| 2012/0096342 | A1* | 4/2012 | Wang | G06F 16/93 715/234 |
| 2012/0110436 | A1* | 5/2012 | Adler, III | G06F 40/126 715/234 |
| 2012/0254348 | A1* | 10/2012 | Chaturvedi | G06F 16/1794 709/217 |
| 2013/0104029 | A1* | 4/2013 | Hendry | G06F 40/166 715/234 |
| 2014/0180846 | A1 | 6/2014 | Meron | |
| 2015/0193389 | A1* | 7/2015 | Rose | G06F 16/9566 715/208 |

OTHER PUBLICATIONS

Extended European Search Report for corresponding European application No. 17864830.9; dated Jun. 26, 2020 (8 pages).

* cited by examiner

SYSTEM AND METHOD FOR ON-THE-FLY CONVERSION OF NON-ACCESSIBLE ONLINE DOCUMENTS TO ACCESSIBLE DOCUMENTS

FIELD OF THE INVENTION

The present invention relates to the field of Internet accessibility. More particularly, the invention relates to a system and method for providing accessibility to peoples with various disabilities to non-accessible online documents.

BACKGROUND OF THE INVENTION

The accessibility of web content is intended to allow access and use of web contents to people with disabilities, such as those suffering from visual and physical limitations. A set of accessibility guidelines which is accepted worldwide is the Web Content Accessibility Guidelines (WCAG) 2.0., which in fact has become a standard for accessibility. The term "accessibility", when used throughout this document, relates to the act of making documents to be viewable or understandable by those suffering from disabilities that prevent them from reading these documents in their original form.

Typically, a website includes a main content which is provided in HTML format, external documents (such as PDF documents, WORD documents, excel documents, etc.) that are stored in their original format, and links to HTML pages that are located within the same website or within external websites. The term "external documents", as used herein, refers to documents that are stored in their original form within a website, while access to open said external documents becomes possible by means of suitable links or icons appearing within web pages of the website. In order to meet the accessibility standard, all said types of contents that are available within the website, namely, both the HTML documents and the "external documents" must be accessible to both healthy people and to those people with disabilities.

Various prior art solutions have been provided so far in adapted websites to meet said disability standards. For example, a disability menu-ruler is provided within the homepage or each webpage of the website to enable a disabled user to adapt the display to his limitations. The ruler, for example, includes tools that when activated enable the user: (a) to activate a reader sound that vocally reads the content, (b) to increase the size of the text letters; (c) to change the font or background color; (d) to vary the size of images; and more. These tools are typically adapted to operate on the HTML pages. In order to allow the ruler to operate on said external documents (i.e., those PDF, WORD, EXCEL, etc. documents), performance of a significant off-line manual preparation work is required on each of such documents to adapt it to react to the accessibility tools. For example, the following manual conversion operations must be performed on a regular PDF document in order to adapt it to react to an accessibility ruler:

a. Classification of titles within the non-accessible document
b. Provision of alternative text for photographs, if exist within the document;
c. Replacement of a font or font color, if it becomes necessary;
d. Insertion of definitions for accessibility screen readers;
e. Storing of the accessible document;

As becomes apparent, the prior art solutions for providing accessibility to external documents require significant manual work in each external document, before the converted document can be uploaded to website. Therefore, an owner of a web-site that contains many links to external documents is required to spend very significant time and resources in order to provide accessibility to all the documents included within his website.

In addition, in case of a manual conversion of documents (to become accessible), some documents within a frequently updated website may be overlooked, and may remain non-accessible even after the performance of the process to make the website accessible.

Furthermore, according to the prior art, each time a web-page owner adds to the web-page a link to a new external document, there is a need to ensure that the document becomes accessible, and this involves spending of a significant off-line manual work. Therefore, according to the prior art the manual maintenance in a dynamically changed website to make the documents accessible in fact never ends.

It is therefore an object of the present invention to eliminate the spending pf a significant amount of manual work on each external document within a website, in order to allow accessibility thereto.

It is another object of the present invention to provide a method and system for on-the-fly fully automatic conversion of each external document within the website, therefore to make all the documents, whether already existing within the website, or those newly introduced, to be immediately available in a form meeting the accessibility standards.

Other objects and advantages of this invention will become apparent as the description proceeds.

SUMMARY OF THE INVENTION

The invention relates to a method for an automatic and on-the-fly conversion of website's non-accessible documents to respective documents in an accessible format, comprising: (a) inserting a first script within each web page of said website that contains one or more non accessible documents; (b) upon loading of a web page from said website to a user's browser, executing said first script, which in turn identifies all original links within said web page to non-accessible documents, said script also substitutes a respective alternative link for each of said original links respectively, each of said alternative links leads to an alternative address, respectively, within a conversion server; (c) upon clicking by a user of one of said alternative links, extracting by said conversion server the respective non-accessible document, and transferring the respective non accessible document to said conversion server; (d) converting said non-accessible document to a respective document in an HTML format; (e) adding to said HTML format document at least an accessibility ruler script, thereby creating an accessible document; (f) optionally adding one or more additional scripts to said accessible document; and (g) displaying said accessible document at the user's browser, while simultaneously executing said accessibility ruler script and said additional scripts, if exist.

In an embodiment of the invention, one of said additional scripts is a script which is common to all the converted documents, and which improves the layout of the document beyond the layout which is provided by said conversion to HTML format.

In an embodiment of the invention, one of said additional scripts is a script which is specific to each converted document, and which resolves problems that are specific to the converted document.

In an embodiment of the invention, said conversion server further comprises an internal database for storing each previously converted accessible document in HTML format, and wherein said accessible document is displayed at the user's browser without need for conversion.

In an embodiment of the invention, the method further comprising searching said database to verify whether the database comprises said previously converted document.

In an embodiment of the invention, said conversion to HTML format is performed within the conversion server.

In an embodiment of the invention, said conversion to HTML format is performed within a third party server which is accessible by said conversion server.

In an embodiment of the invention, each of said alternative links is provided in addition to the respective original link.

In an embodiment of the invention, said non accessible documents are documents in a format selected from PDF, WORD, or Excel.

The invention also relates to a system for an automatic on the fly conversion of a non-accessible document at a website to an accessible document, which comprises: (A) a conversion server which in turn comprises: (a) means for inserting a first script within each web page of said website that contains one or more non accessible documents, which upon execution, identifies all original links within said web page to non-accessible documents, said script also provides a respective alternative link to each of said original links respectively, each said alternative links leads to an alternative address, respectively, within the conversion server; (b) means for extracting a respective non-accessible document from said website, to within said conversion server;

a converter for converting each non-accessible document to a respective document in an HTML format; (c) means for adding to said HTML format document at least an accessibility ruler script, thereby creating an accessible document; (d) means for optionally adding one or more additional scripts to said accessible document; and (f) means for displaying said accessible document at the user's browser, while simultaneously executing said accessibility ruler script and said one or more additional scripts, if exist.

In an embodiment of the invention, said converter is located at a third party location.

DETAILED DESCRIPTION OF THE INVENTION

The present invention introduces a system and method for the automatic and on-the-fly conversion of external documents within a website, from their non-accessible form to their accessible form, and following this conversion, providing an alternative link within the website to the accessible document (in HTML format).

Figure 1:
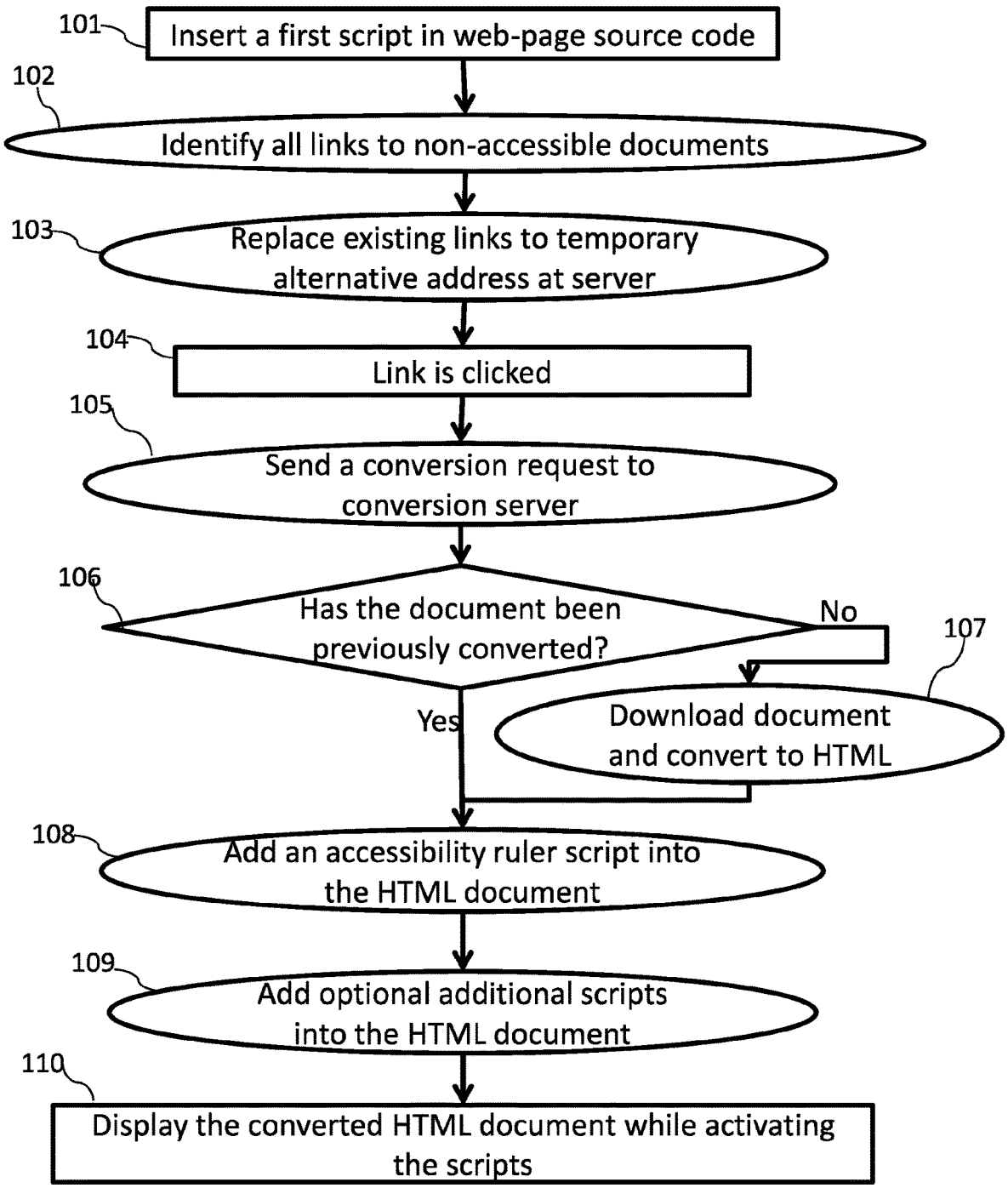
FIG. 1 illustrates a flowchart describing the process for an automatic conversion of online documents from non-accessible form to accessible, according to an embodiment of the invention.

FIG. 1 illustrates in a flow-diagram form a process for converting each online document from its non-accessible form to an accessible form, according to an embodiment of the invention. In step 101, which is generally performed on-line (but could also be performed off-line), a script containing several lines of code is inserted into the source code of a web-page. The script can be inserted at the head or body section of the web-page's source code. As result of this insertion, when the web-page is accessed by a user and loaded to his browser, the script is automatically executed without requiring any further action by the user. In step 102 the script identifies all the links within the web page that direct to external documents, for example, PDF, WORD, EXCEL documents, etc. In step 103, each of said identified links is replaced to direct to a temporary alternative address, which is different from the original link More specifically, the alternative address leads to a location requesting conversion of the file, rather than displaying the original (non-accessible) file to the user. The process proceeds in step 104, where one of said links is clicked by the user. Next, and following said user's clicking, in step 105 a conversion request, comprising the link to the original document is sent to an accessibility remote server associated with the present invention. The remote server includes at least software for performing automatic conversion of documents from non-accessible format to an HTML accessible format, and a link database containing records of previously converted documents and their links.

In step 106, and upon receipt of the request for conversion as sent in step 105, the remote server searches within its link-database for determining whether the link to the non-accessible document is already stored therein. As the link database stores only links for external documents that have already been converted, the existence of the present link within said database is an indication that a respective document in an accessible format already exists within the accessibility server. If, on the other hand, it is found in step 106 that the document has not been previously converted, in step 107 the original document is downloaded to the accessibility server, and converted to an HTML format. In such a manner, a respective accessible document which contains all the content of the non-accessible document is automatically created. Once converted, the accessible document is stored within the remote server, and the new address to the accessible file is stored within the link database, together with the original link for future reference. In step 108 an accessibility ruler script is embedded within the converted HTML document. In step 109, additional optional scripts are embedded within the document. For example, said additional scripts may include: (a) an optional generic script for correcting in each document issues that the converter to HTML has not resolved. For example, the generic script may improve the "readability" of some of the document sections a document sound reader utility; and (b) an optional unique script, which is specific to each document, which enables correction of specific issues that are specific to this document only. As the document is now accessible and comprises all the required scripts that are embodied within it, in step 110 the document is now displayed within the user's browser. Said scripts that are embodied within the displayed HTML document are activated, including the accessibility ruler (or tool-bar) with all its tools, the document sound reader, etc. The accessibility ruler (or tool-bar) is well known in the art, and it enables the user to apply on the HTML document various accessibility features that meet the accessibility standards.

If, however, in step 106 the document has been determined to previously been converted, the previously converted document is extracted from a documents database within the remote server, and 108-110 are performed as described before. More specifically, once a specific document is converted to an accessible form, there is no necessity for an additional conversion, and the accessible document is simply displayed to the user in step 110. It should be noted that if the previously converted document includes the embedded scripts, there is no necessity to perform steps 108-109, and the document is immediately displayed in step 110. If, however, the previously converted document has been stored without the scripts, performance of step 108 and 109 (only optional) is necessary.

According to another embodiment of the invention, after identifying all the links to external documents on a web page, i.e. after step 102, all the links are extracted, after which the links are sent to a remote server. A link database is searched for documents that have previously been converted, according to the links received at the server. Next, all the documents that have been identified as not previously converted are downloaded to the server, and are converted from a non-accessible form to an accessible form. Next, each of the documents is assigned with a unique web address. Finally the links in the original web-page are replaced to direct to a corresponding accessible document, as now existing within the accessibility server.

According to an embodiment of the invention, the conversion of a document from a non-accessible form to an accessible form is performed by a conversion-to HTML tool known in the art, such as "PDF Converter Ultimate"—www.micropdf.com/, or "PDF online"—www.pdfonline.com. The conversion to HTML tool may reside locally within the accessibility server, or remotely. As noted, the result of the conversion is an HTML file, which allows a display of the original content along with an accessibility ruler. Consequently, in addition to presenting a user-friendly document, this result may also allow a person with disabilities to use assistive technology, such as a screen reader or a braille display, in order to present to him in an accessible form an online document which was previously existed in within the website in a non-accessible form.

The accessible document which is provided within the user's browser in fact comprises two sections, a layout section, and a dynamic section. The layout comprises, among other, the scripts 108 and 109 of FIG. 1.

The dynamic section contains the content, which is in fact identical to the content of the original non-accessible document, however in HTML format. This section may include text, images, tables, or any other content presented within the document.

According to the invention, the accessibility of a document according to the invention includes various features, either visual or hidden, that conform to the guidelines defined in WCAG 2.0. An example of such a feature is the ability to adjust the size of fonts within a document. Another example is the ability to adjust the colors of a document for a color blind user, the background of the document, etc. All said features are activated by the ruler or the toolbar.

Figure 2A:
FIG. 2a shows a document before conversion.
Figure 2B:
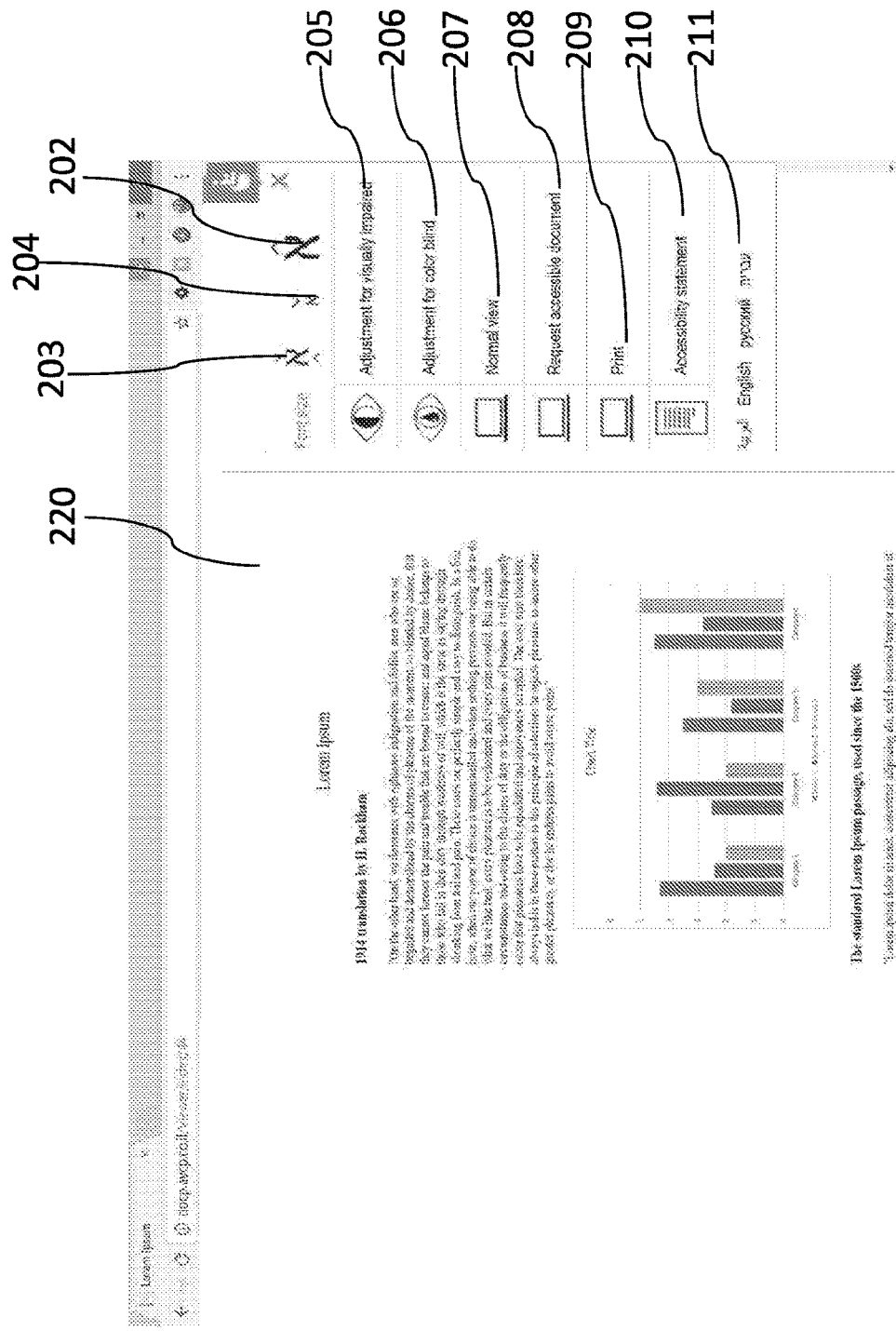
FIG. 2b shows the document of FIG. 2a after conversion by the invention to an accessible form, this accessible document comprises an accessibility ruler.

FIG. 2a shows a typical document 20 that exists within a website in PDF format. FIG. 2b shows a document 220, which is in fact the document 20 of FIG. 2a, after conversion into an accessible HTML format, as presented to the user. More specifically, an accessibility ruler 201 is displayed besides the accessible document 220. This ruler allows applying accessibility features on document 220. Tab 202 allows enlargement of the font size of text in the document. Tab 203 allows one to decrease the size of the font. Tab 204 allows to restores the size of the font to its original size. Tab 205 allows adapting the document to visually impaired users by changing the colors of the text and the background to increase the contrast between the two. Tab 206 allows adapting the document to color blind users by changing the colors of the document solely to black and white. Tab 207 allows restoring the original features of the document. Tab 208 allows sending an individual request to convert a document from non-accessible to accessible. Tab 209 allows printing the original non-accessible document. Tab 210 allows presenting an accessibility declaration. Tab 211 allows a user to change the language of the ruler.

Figure 3:
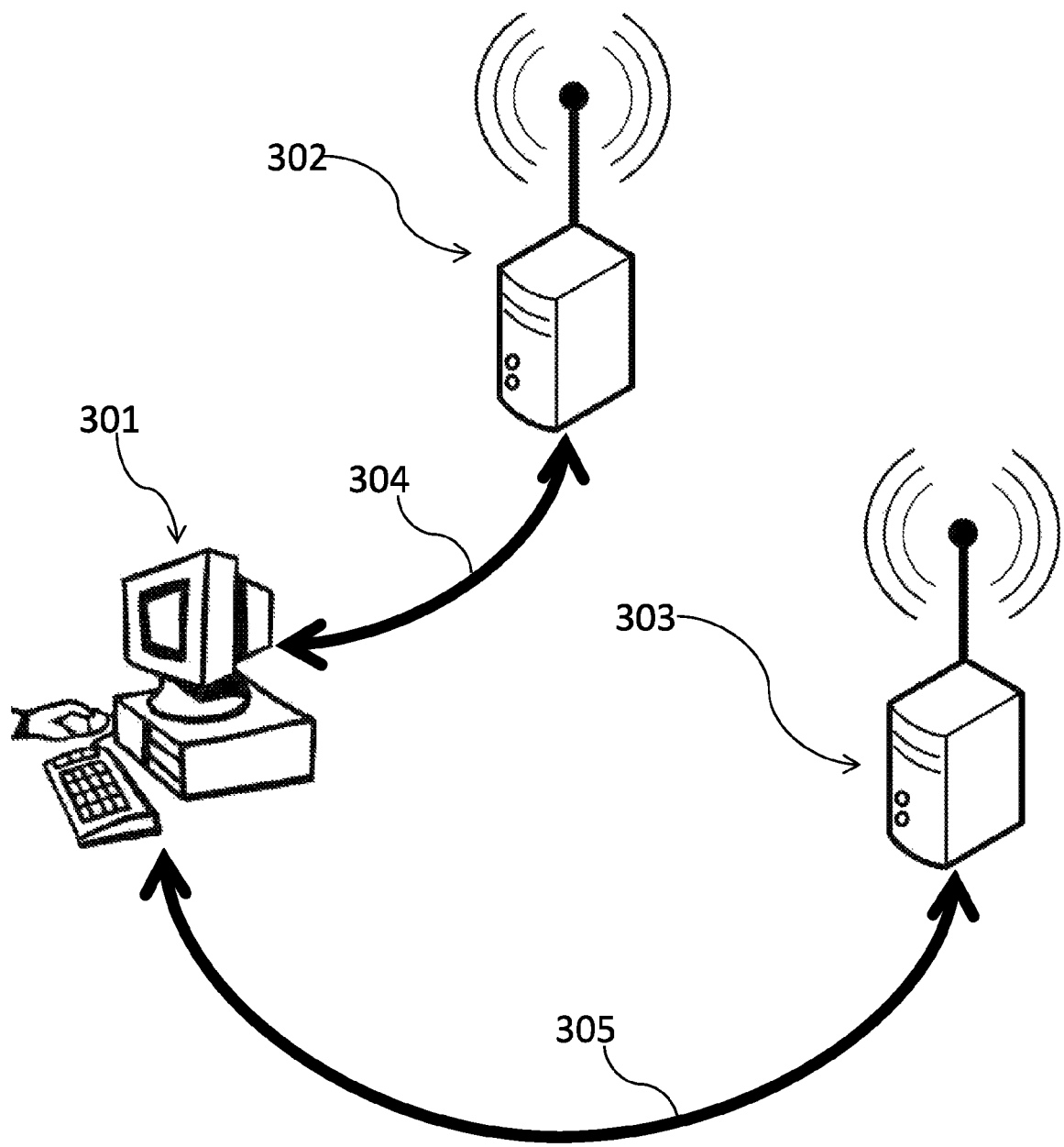
FIG. 3 schematically illustrates a general structure of the system of the invention.

FIG. 3 schematically illustrates in general terms a system adapted to convert online documents from non-accessible form to an accessible form according to an embodiment of the invention. User 301 is connected to a web page which contains a link, denoted in FIG. 3 by numeric 304, to a document which is hosted at server 302. Link 304 is swapped with a link 305 that directs to an accessible version of the original document, namely a document in HTML format that is either hosted on accessibility server 303, or is converted on the fly by the accessibility server 303 into an accessible form. Server 303 includes at least software for performing conversion of documents from non-accessible form to an accessible form, and a database containing records of previously converted documents and their parameters.

Figure 4:
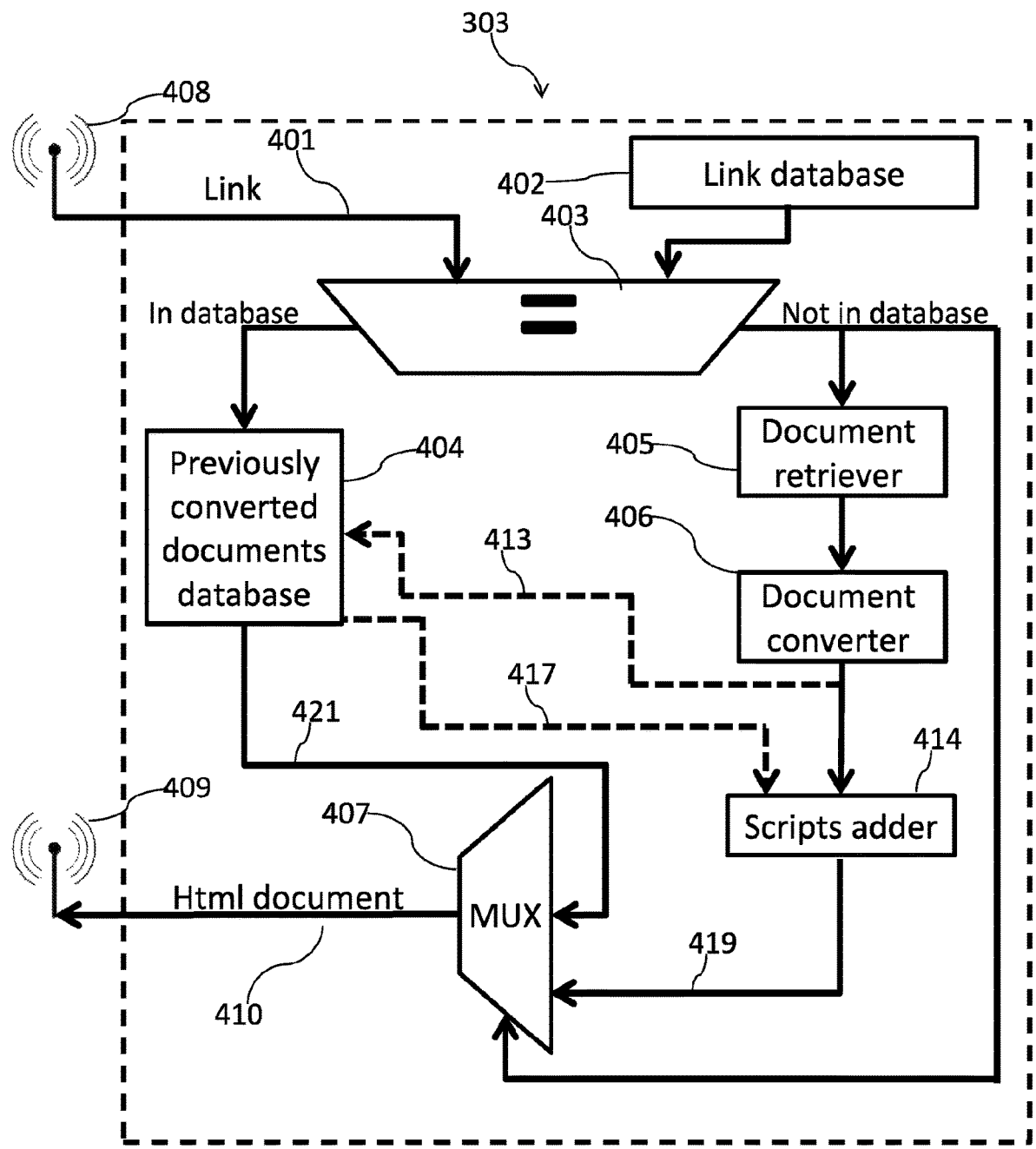
FIG. 4 illustrates a structure of the system, according to an embodiment of the invention.

FIG. 4 schematically illustrates a block diagram of an accessibility server 303, for performing on-the-fly conversion of documents from a non-accessible form to an accessible form, according to an embodiment of the invention. Accessibility server 303 comprises an input 401 for receiving links to documents for conversion; a link database 402 comprises a record of links to documents that were previously converted; a comparator 403 for comparing a link at input 401 to links in database 402; a document database 404 comprising documents that were previously converted from a non-accessible form to an accessible form; a document retriever 405 for downloading documents from their respecting location (not shown) within the website; a document converter 406 for converting documents from a non-accessible form to an accessible form; a script adder 414 for adding the scripts 108 and 109 of FIG. 1 into the converted document (depending on the structure of the documents stored within the document database 404, the script adder may add the scripts also to previously converted documents that are stored within database 404; an output 410 for transmitting a converted HTML document into the user's browser; and a multiplexer (MUX) 407 for determining the origin of the HTML document which is to be presented at output 410. The accessibility server further includes internet communication means 408 and 409, for receiving links from a web-page and for transmitting converted documents to a user.

When a conversion request, comprising a link, arrives at input 401, the link is compared by comparator 403 to each of the links in link database 402. If the link is identical to a link from database 402, the corresponding HTML document is extracted from previously converted documents database 404. If the link is not identical to any of the links in database 402, document retriever 405 downloads the non-accessible document from its location within the website, and document converter 406 converts the document to HTML format. The converted document is sent 413 to document database 404 for future reference. Then, the scripts adder 414 adds to the converted document (either from database 404 or optionally from documents converter 406—as shown by arrow 417) the scripts 108 and 109. MUX 407 selects the accessible document either from input 419 or from input 421, and outputs the selected accessible document 410 to be displayed at the user's browser.

It should be noted that the website may present to the user two separate links for a same document: a first "not accessible" link for "regular" people that do not need accessibility features. In such a case, the regular people that click on this link will "activate" the regular document without activating the process of the present invention. The other link will relate to an icon for the "accessibility" document that upon clicking on the same, the procedure of the present invention will be activated.

As shown, the present invention enables an automatic on the fly conversion of non-accessible documents to an accessible format. It has been found that a non-accessible document can be automatically converted into an accessible form within very few seconds, typically within less than 15 seconds. Moreover, the entire conversion process of the invention is fully automatic, in contrast to the conversion process of the prior art which requires a manual handling of each and every document.

The accessibility solution of the present invention is suitable for a wide range of devices, such as computers, mobile smartphones, electronic notebooks and other electronic devices that a person with disabilities may wish to use in order to display an electronic document. Additionally the solution of the present invention allows a person with disabilities to open any online document while being assured the document will be accessible, and compatible with other accessibility software, such as screen readers and braille displays.

As various embodiments have been described and illustrated, it should be understood that variations will be apparent to one skilled in the art without departing from the principles herein. Accordingly, the invention is not to be limited to the specific embodiments described and illustrated in the drawings.

The invention claimed is:

1. A method for an automatic and on-the-fly conversion of website's non-accessible documents to respective documents in an accessible format, comprising:
   a. inserting a first script within source code of each web page of said website that contains one or more non accessible documents;
   b. upon loading of a web page from said website to a user's browser, executing said first script, which in turn identifies all original links within said web page to non-accessible documents, said first script also substitutes a respective alternative link for each of said original links respectively, each of said alternative links leads to an alternative address, respectively, within an accessibility server;
   c. upon clicking by a user of one of said alternative links, extracting by said accessibility server the respective non-accessible document, and transferring the respective non accessible document to said accessibility server;
   d. converting content of said non-accessible document to identical content of a respective document in an HTML format;
   e. adding to said HTML format document at least an accessibility ruler script, thereby creating an accessible document;
   f. optionally adding one or more additional scripts to said accessible document; and
   g. opening said accessible document with the user's browser, while simultaneously executing said accessibility ruler script and said additional scripts, if exist.

2. The method of claim 1, wherein one of said additional scripts is a script which is common to all the converted documents, and which improves the layout of the document beyond the layout which is provided by said conversion to HTML format.

3. The method of claim 1, wherein one of said additional scripts is a script which is specific to each converted document, and which resolves problems that are specific to the converted document.

4. The method of claim 1, wherein said accessibility server further comprises an internal database for storing each previously converted accessible document in HTML format, and wherein said accessible document is displayed at the user's browser without need for conversion.

5. The method of claim 4, further comprising searching said database to verify whether the database comprises said previously converted document.

6. The method of claim 1, wherein said conversion to HTML format is performed within the accessibility server.

7. The method of claim 1, wherein said conversion to HTML format is performed within a third party server which is accessible by said accessibility server.

8. The method of claim 1, wherein each of said alternative links is provided in addition to the respective original link.

9. The method of claim 1, wherein said non accessible documents are documents in a format selected from PDF, WORD, or Excel.

* * * * *